United States Patent Office 3,258,306
Patented June 28, 1966

3,258,306
METHOD OF RETARDING WATER SURFACE EVAPORATION
Nicky Beredjick, Chicago, Ill., assignor to Standard Oil Company, Chicago, Ill., a corporation of Indiana
No Drawing. Filed June 28, 1962, Ser. No. 205,864
7 Claims. (Cl. 21—60.5)

This invention relates to a method for retarding water surface evaporation. It particularly relates to an improved method for retarding the evaporation of water from large open bodies thereof, especially from reservoirs having extended surfaces normally in contact with the atmosphere; and more particularly relates to an improved evaporation retardant composition and method of applying such composition to the extended water surface to form and maintain a barrier to reduce the evaporation of water.

The problem of reducing water surface evaporation to reduce the loss of water is old and well known. The covering of the surface of water reservoir is a challenging problem when one considers the area to be covered and related problems.

It has been discovered that the combination of 1-(2-hydroxyethyl)-2-heptadecyl imidazoline and a $C_1$-$C_5$ aliphatic alcohol produces an unique composition having the unique property of acting as a water evaporation retardant composition when applied to the surface of water. The 1-(2-hydroxyethyl)-2-heptadecyl imidazoline content of this novel composition is within the range of from about 0.01 to about 20%, preferably 0.1 to about 2%. The imidazoline component is a well-known chemical compound, and is commercially available under the trade name Amine–S. That such a combination would produce a barrier to water evaporation when floated on the surface of water was a wholly unexpected result, for 1-(2-hydroxyethyl)-2-heptadecyl imidazoline (hereinafter referred to for purposes of brevity as Amine–S), when placed on the surface of water was substantially ineffectual as a water evaporation retardant. Under the condition hereinafter described, it gave only about 5.5% reduction in evaporation. The short-chain aliphatic alcohols being either water-soluble or water-miscible, do not function as water evaporation retardants. However, the combination of these compounds produces an effective water evaporation retardant composition.

The short-chain saturated aliphatic alcohols suitable for use in preparing the water evaporation retardant composition of this invention are methanol, ethanol, propanol, butanol, and pentanol, and their respective isomeric form. Ethanol and isopropyl alcohol are preferred. While it is preferred that these alcohols be anhydrous when mixed with Amine–S, they can contain 5 to 10% water.

The application of the evaporation retardant composition of this invention is accomplished simply by placing the composition on the surface of the water. When the composition is applied to the surface, it immediately begins to form a film. The application of the composition can be accomplished in a number of ways, such as by spraying, floating on, dripping or any combination of these so as to give a regulated and continual make-up as required under the conditions at hand. Generally, the amount of the composition to be applied to the surface of the water can be determined by mere routine tests by one skilled in the art in possession of this disclosure, bearing in mind the extent and duration of protection desired. Since the object of covering the water surface with the composition is to form a substantially monomolecular film of the composition, the amount of the composition that is added to the water surface will depend upon weather conditions, wind velocity and other circumstances. Specific amounts of the evaporation retardant composition are not critical.

Example I

The effectiveness of alcoholic solutions of Amine–S containing varying amounts of Amine–S was ascertained in the following manner. Approximately 50 ml. of water was introduced into crystallizing dishes (three-inch diameter) and then 0.2 ml. of anhydrous isopropyl alcohol solutions of Amine–S, containing varying amounts of Amine–S, was floated on the surface of the water. Appropriate controls containing approximately 50 ml. of water and 0.2 ml. of isopropanol on the surface were weighed and then placed in a humidity cabinet equipped with a small exhaust fan for circulating air through the cabinet. The humidity inside of the cabinet was maintained at 35 to 40% by use of indicating Drierite, placed in trays along the walls of the cabinet. The amount of water evaporated was ascertained by periodic weighings of the test dishes, and the grams of water lost was noted. The average percent reduction of water evaporation due to covering a surface of water undergoing evaporation in the manner above described is shown in Table I.

TABLE I

| Exposure (Hours) | Concentration of Amine-S in Iso-Propyl Alcohol | | | | |
|---|---|---|---|---|---|
| | 0.1% | 0.2% | 2.0% | 10% | 20% |
| | Percent Reduction of Water Evaporation | | | | |
| 19 | | 26.2 | | | |
| 21.5 | 20.4 | | | | |
| 24 | | | 21.5 | 18.5 | 16.5 |
| 45.5 | 17.6 | 24.7 | | | |
| 47 | | | 18.0 | 17.0 | 14.5 |
| 68 | | 25.2 | | | |
| 71 | | | 18.0 | 16.5 | 16.0 |
| 117.5 | 20.5 | | | | |
| 143 | | | 19.0 | 17.0 | 16.0 |
| 148 | | 26.9 | | | |

Similarly, 0.1 g. of solid Amine–S, when spread as excess solids, was floated on the surface of water a reduction of about 5.5% in water evaporation was obtained.

Example II

An ethanol solution (95%) of Amine–S containing 0.2% Amine–S was tested in a manner set forth in Example I. After 18 hours of exposure, there was an average reduction of 31% in water evaporation.

The above data show that by covering the surface of water with a layer of the water evaporation retardant composition disclosed herein, there is a substantial decrease in the rate of evaporation of the water from the surface thereof. Thus, the present invention provides an economical water evaporation retardant composition which remains liquid over widely varying temperatures and which, when applied to the surface of water, creates an effective barrier to the evaporation of water from water surfaces.

Thus having described the invention, what is claimed is:
1. A method for retarding the evaporation of water from a surface thereof which comprises covering said surface with a water evaporation retardant composition comprising 1-(2-hydroxyethyl)-2-heptadecyl imidazoline and an aliphatic alcohol having 1 to 5 carbon atoms, said composition containing from about 0.01 to about 20% of said imidazoline.

2. A method for retarding the evaporation of water from a surface thereof which comprises adding to said surface a water evaporation retardant composition comprising 1-(2-hydroxyethyl)-2-heptadecyl imidazoline and an aliphatic alcohol having 1 to 5 carbon atoms at a regulated rate to form and maintain a film of said composition upon the water surface; said composition containing from about 0.01 to about 20% of said imidazoline.

3. The method of claim 2 wherein said alcohol is ethyl alcohol.

4. The method of claim 2 wherein said alcohol is isopropyl alcohol.

5. The method of retarding the evaporation of water from an open reservoir thereof which comprises adding to the surface of said water a water evaporation retardant composition consisting essentially of 1-(2-hydroxyethyl)-2-heptadecyl imidazoline and an aliphatic alcohol having 2 to 3 carbon atoms at a regulated rate to form and maintain a film of said composition upon the water surface, said composition containing from about 0.01 to about 20% of said imidazoline.

6. The method of claim 5 wherein said alcohol is ethyl alcohol.

7. The method of claim 5 wherein said alcohol is isopropyl alcohol.

References Cited by the Examiner
UNITED STATES PATENTS

| | | | |
|---|---|---|---|
| 2,226,057 | 12/1940 | Graenacher et al. | 260—309 |
| 2,878,098 | 3/1959 | Treloar et al. | 21—60.5 |
| 3,036,880 | 5/1962 | Malkemus | 21—60.5 |
| 3,082,058 | 3/1963 | Rosano | 21—60.5 |

OTHER REFERENCES

The Condensed Chemical Dictionary, 1961, Reinhold Pub. Co., page 57.

Timblin and Florey, Reservoir Evaporation Reduction Through the Use of Monomolecular Layers, Sept. 25, 1957, pages 1 and 2.

MORRIS O. WOLK, *Primary Examiner.*

JOSEPH SCOVRONEK, *Examiner.*

E. SZOKE, F. W. BROWN, *Assistant Examiners.*